United States Patent
Li (10) Patent No.: US 9,832,275 B2
(45) Date of Patent: Nov. 28, 2017

(54) MESSAGE PROCESSING METHOD, DEVICE AND SYSTEM FOR INTERNET OF THINGS

(71) Applicant: ZTE Corporation, Shenzhen, Guangdong (CN)

(72) Inventor: Qiuting Li, Shenzhen (CN)

(73) Assignee: XI'AN ZHONGXING NEW SOFTWARE CO.LTD., Xi'An (CN)

( * ) Notice: Subject to any disclaimer, the term of this patent is extended or adjusted under 35 U.S.C. 154(b) by 517 days.

(21) Appl. No.: 14/410,850

(22) PCT Filed: Jul. 4, 2013

(86) PCT No.: PCT/CN2013/078841
§ 371 (c)(1),
(2) Date: Dec. 23, 2014

(87) PCT Pub. No.: WO2014/005535
PCT Pub. Date: Jan. 9, 2014

(65) Prior Publication Data
US 2015/0189030 A1    Jul. 2, 2015

(30) Foreign Application Priority Data

Jul. 4, 2012  (CN) .......................... 2012 1 0229807

(51) Int. Cl.
*G06F 15/16* (2006.01)
*H04L 29/08* (2006.01)
*H04L 12/58* (2006.01)

(52) U.S. Cl.
CPC .............. *H04L 67/28* (2013.01); *H04L 51/18* (2013.01); *H04L 67/02* (2013.01); *H04L 67/2833* (2013.01); *H04L 67/2842* (2013.01)

(58) Field of Classification Search
CPC ....................................................... H04L 51/18
See application file for complete search history.

(56) References Cited

U.S. PATENT DOCUMENTS 8,307,051 B2    11/2012  Tapuska
9,106,617 B2 *   8/2015  Kshirsagar .......... H04L 63/0428
(Continued)

FOREIGN PATENT DOCUMENTS

CN         1691632 A    11/2005
CN       101043661 A     9/2007
(Continued)

OTHER PUBLICATIONS

Supplementary European Search Report in European application No. 13812651.1, dated Jun. 19, 2015.
(Continued)

*Primary Examiner* — Michael Y Won
*Assistant Examiner* — Nicholas Celani
(74) *Attorney, Agent, or Firm* — Oppedahl Patent Law Firm LLC (57) ABSTRACT

A message processing method, device and system for Internet of Things are described. The method includes that: a gateway of the Internet of Things receives one or more operation messages transmitted by a plurality of transmitters for one or more operations of a terminal; and the gateway of the Internet of Things caches and pre-processes the received one or more operation messages in a message queue, and according to a processing result, sends at least one operation message in the message queue to a terminal. By the disclosure, the problems existing in the process of executing interactive operations on the terminal in the related art are solved, the energy consumption generated when the terminal executes the operation messages is saved, and the resource loss of the Internet of Things is reduced.

10 Claims, 5 Drawing Sheets (56) References Cited

U.S. PATENT DOCUMENTS

| | | |
|---|---|---|
| 2005/0122936 A1 | 6/2005 | Son |
| 2005/0228873 A1 | 10/2005 | Tapuska |
| 2006/0109857 A1 | 5/2006 | Herrmann |
| 2009/0144385 A1* | 6/2009 | Gold ............... G06Q 30/00 709/206 |
| 2009/0232081 A1 | 9/2009 | Son |
| 2010/0146067 A1 | 6/2010 | Tapuska |
| 2011/0138400 A1 | 6/2011 | Chandler |
| 2012/0167116 A1 | 6/2012 | Chandler |
| 2012/0210334 A1* | 8/2012 | Sutedja ............ G06Q 10/107 719/314 |

FOREIGN PATENT DOCUMENTS

| | | |
|---|---|---|
| CN | 101150354 A | 3/2008 |
| CN | 101160565 A | 4/2008 |
| CN | 101166208 A | 4/2008 |
| CN | 101340612 A | 1/2009 |
| CN | 101362334 A | 2/2009 |
| CN | 101499017 A | 8/2009 |
| CN | 101767590 A | 7/2010 |
| CN | 101808025 A | 8/2010 |
| CN | 102014052 A | 4/2011 |
| EP | 1530384 A2 | 5/2005 |
| EP | 2549684 A1 | 1/2013 |
| JP | 2001344121 A | 12/2001 |

OTHER PUBLICATIONS

International Search Report in international application No. PCT/CN2013/078841, dated Oct. 10, 2013.

English Translation of the Written Opinion of the International Search Authority in international application No. PCT/CN2013/078841, dated Oct. 10, 2013.

\* cited by examiner

MESSAGE PROCESSING METHOD, DEVICE AND SYSTEM FOR INTERNET OF THINGS

TECHNICAL FIELD

The disclosure relates to the field of communications, and in particular to a message processing method, device and system for Internet of Things.

BACKGROUND

With the development of the Internet of Things, vertical industry applications of the Internet of Things are gradually blended and progress toward a horizontal application mode. One terminal in the Internet of Things may exchange information with a plurality of applications/platforms, and at the same time, may also exchange information with a plurality of users in one application to realize device sharing. A gateway of the Internet of Things, as an important network element in an architecture of the Internet of Things, provides a capability of information interaction between the applications/platforms of the Internet of Things and a terminal device. Especially for some terminal devices having limited capability in the Internet of Things, the gateway of the Internet of Things will provide more capabilities to realize the application of the Internet of Things. Here, the terminal device may be simply referred to as a terminal, may also be referred to as a device.

At present, in the specific embodiments of the Internet of Things, the plurality of applications/platforms may exchange information with the same terminal device through the gateway of the Internet of Things. However, the same operation frequently executed on the terminal device within a certain period of time will increase the resource loss such as the energy consumption of the terminal device, or execution of operations in conflict with each other on the terminal device within a certain period of time, such as making a device sleep to save energy and waking up the device for reading information, or reading the information of the device and modifying the data of the device, or the like, will influence the accuracy of the read data and increase the complexity of the operation.

At present, no effective solution has been proposed for the problem already existing in the process of executing interactive operations on the terminal device in the related art.

SUMMARY

For the problem existing in the process of executing interactive operations on a terminal device in the related art, the disclosure provides a message processing method, device and system for Internet of Things, by which the above problem is solved.

According to an aspect of the disclosure, a message processing method for Internet of Things is provided, including that: a gateway of the Internet of Things receives one or more operation messages transmitted by a plurality of transmitters for one or more operations of a terminal; and the gateway of the Internet of Things caches and pre-processes the received one or more operation messages in a message queue, and according to a processing result, sends at least one operation message in the message queue to the terminal.

In an embodiment, that the gateway of the Internet of Things pre-processes the received one or more operation messages in the message queue may include that: the gateway of the Internet of Things adjusts a message sequence of the received one or more operation messages in the message queue corresponding to the terminal according to a configured policy.

In an embodiment, that the gateway of the Internet of Things pre-processes the received one or more operation messages in the message queue may include that: the gateway of the Internet of Things merges operation messages indicative of a same operation in the received one or more operation messages and/or operation messages indicative of the same operation in the message queue corresponding to the terminal.

In an embodiment, adjusting the message sequence of the received one or more operation messages in the message queue corresponding to the terminal may include that: when there is a conflict between the received one or more operation messages and one or more operation messages in the message queue and operation messages in conflict have different priority, the gateway of the Internet of Things adjusts a sending sequence of operation messages in the message queue according to the configured policy and executes operation messages having high priority prior to the operation messages having low priority in the operation messages in conflict; and/or when there is a conflict between the received one or more operation messages and one or more operation messages in the message queue and the operation messages in conflict have the same priority, the gateway of the Internet of Things rearranges a sending sequence of the operation messages in conflict according to the configured policy.

In an embodiment, that the gateway of the Internet of Things merges the operation messages indicative of the same operation in the received one or more operation messages and/or the operation messages indicative of the same operation in the message queue corresponding to the terminal may include that: when the received one or more operation messages indicate the same operation as one or more operation messages in the message queue and the operation messages indicative of the same operation have different priority, the gateway of the Internet of Things merges the operation messages indicative of the same operation into a corresponding position of an operation message having the highest priority in the operation messages indicative of the same operation according to the configured policy; and/or when the received one or more operation messages indicate the same operation as one or more operation messages in the message queue, and the operation messages indicative of the same operation have the same priority, the gateway of the Internet of Things merges the operation messages indicative of the same operation into a position where the operation messages indicative of the same operation already existing in the message queue of the terminal are located and executes the same; and/or when the received one or more operation messages indicate the same operation, the gateway of the Internet of Things merges the operation messages indicative of the same operation into a corresponding position of an operation message having the highest priority in the received one or more operation messages according to the configured policy.

In an embodiment, the message queue corresponding to the terminal may include a first queue and a second queue, the first queue is configured to store the operation messages of the terminal, the second queue is configured to store a sending sequence of the operation messages of the terminal, the sending sequence includes an access address of a status of the terminal and address information corresponding to the operation messages in the first queue; correspondingly, sending at least one operation message in the message queue to the terminal according to the processing result may include that: the gateway of the Internet of Things reads status information of the terminal according to the access address in the second queue; the gateway of the Internet of Things reads at least one operation message of the terminal stored in the first queue according to the address information of the operation messages in the second queue; and the gateway of the Internet of Things sends the at least one operation message which is read to the terminal according to the processing result.

In an embodiment, that the gateway of the Internet of Things sends the at least one operation message which is read to the terminal according to the status information of the terminal and according to the processing result may include that: when the status information of the terminal indicates a sleeping or shutdown status, the gateway of the Internet of Things inserts a wakeup or startup message before sending the at least one operation message which is read according to the processing result; or when the status information of the terminal indicates an executing status and the priority of the at least one operation message to be transmitted which has been processed in the message queue is higher than an operation that the terminal is executing, the gateway of the Internet of Things inserts a current operation termination message before sending the at least one operation message which is read according to the processing result.

In an embodiment, after the at least one operation message in the message queue is sent to the terminal according to the processing result, the method further may include that: the terminal executes operations according to the sequence of the at least one operation message processed in the message queue; when an operation is executed successfully, the terminal returns a success message to the gateway of the Internet of Things, wherein the success message contains the status information of the terminal; or when the operation is executed unsuccessfully, the terminal returns a failure message to the gateway of the Internet of Things, wherein the failure message contains the status information of the terminal and a cause of failure.

In an embodiment, the method further may include that: the gateway of the Internet of Things receives a response message returned by the terminal; when the response message is the success message or failure message, the gateway of the Internet of Things transmits the response message to one or more transmitters of one or more operation messages corresponding to the response message, and deletes the one or more operation messages corresponding to the response message from the message queue corresponding to the terminal; or when the response message is that the operation is being executed, the gateway of the Internet of Things labels the status information of the terminal as the executing status.

According to another aspect of the disclosure, a message processing device for Internet of Things is provided, which is located in the gateway of the Internet of Things, and includes: a receiving module, configured to receive one or more operation messages transmitted by a plurality of transmitters for one or more operations of a terminal; and a processing module, configured to cache and pre-process the received one or more operation messages in a message queue, and according to a processing result, send at least one operation message in the message queue to the terminal.

In an embodiment, the processing module may include: an adjustment module, configured to adjust a message sequence of the received one or more operation messages in the message queue corresponding to the terminal according to a configured policy; and/or a merging module, configured to merge operation messages indicative of a same operation in the received one or more operation messages and/or operation messages indicative of the same operation in the message queue corresponding to the terminal.

In an embodiment, the message queue corresponding to the terminal may include a first queue and a second queue, the first queue is configured to store operation messages of the terminal, the second queue is configured to store a sending sequence of the operation messages of the terminal, the sending sequence includes an access address of a status of the terminal and address information corresponding to the operation messages in the first queue; correspondingly, the processing module may include: a reading module, configured to read status information of the terminal according to the access address in the second queue, and read at least one operation message of the terminal stored in the first queue according to the address information of the operation messages in the second queue; and a sending module, configured to, according to the status information of the terminal, send the at least one operation message which is read in the message queue to the terminal according to the processing result.

In an embodiment, the sending module may include an insertion module, configured to, when the status information of the terminal indicates a sleeping or shutdown status, insert a wakeup or startup message before the at least one operation message which is read is sent according to the processing result; or when the status information of the terminal indicates an executing status and the priority of the at least one operation message to be transmitted in the processed message queue is higher than an operation that the terminal is executing, insert a current operation termination message before the at least one operation message which is read is sent according to the processing result.

In an embodiment, the device further may include: a second receiving module, configured to receive a response message returned by the terminal; a transmission module, configured to, when the response message is a success message or a failure message about operation execution, transmit the response message to one or more transmitters of the one or more operation messages corresponding to the response message, and delete the one or more operation messages corresponding to the response message from the message queue corresponding to the terminal; and/or a labelling module, configured to, when the response message indicates that the operation is being executed, label the status information of the terminal as the executing status.

According to another aspect of the disclosure, a message processing system for Internet of Things is also provided, which includes the message processing device for Internet of Things above, and further includes a terminal, wherein the terminal includes: an execution module, configured to execute operations in a sequence of the at least one operation message processed in the message queue; and a returning module, configured to, when an operation is executed successfully, return a success message to the gateway of the Internet of Things, wherein the success message contains the status information of the terminal; and when the operation is executed unsuccessfully, return a failure message to the gateway of the Internet of Things, wherein the failure message contains the status information of the terminal and a cause of failure.

In the disclosure, a gateway of the Internet of Things receives one or more operation messages transmitted by a plurality of transmitters for one or more operations of a terminal; and the gateway of the Internet of Things caches the received one or more operation messages in a message queue and pre-processes the same, and according to a processing result, sends at least one operation message in the message queue to a terminal, so that the problems existing in the process of executing interactive operations on the terminal in the related art are solved, the energy consumption generated when the terminal executes the operation messages is saved, and the resource loss of the Internet of Things is reduced.

BRIEF DESCRIPTION OF THE DRAWINGS

The accompanying drawings described herein serve to provide a further understanding of the disclosure, and constitute a part of this application. The schematic embodiments of the disclosure and description thereof serve to explain the disclosure rather than to limit the disclosure inappropriately. In the drawings.

DETAILED DESCRIPTION

The disclosure will be described below in detail with reference to the accompanying drawings and in conjunction with the embodiments. It should be noted that the embodiments of the application and the features of the embodiments may be combined with each other without any conflict.

In order to realize the high efficient operation performed on a terminal by multiple applications/platforms, the embodiment proposes that a to-be-transmitted message is analyzed and processed according to a certain policy through the gateway of the Internet of Things to solve the problems of conflict and resource loss and long-term exclusive occupation of a certain terminal of the Internet of Things by a certain application or user.

Figure 1:
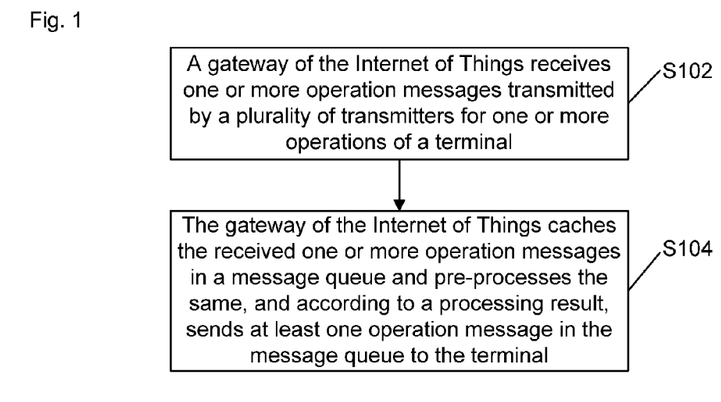
FIG. 1 is a flowchart of a message processing method for Internet of Things according to an embodiment of the disclosure.

In an embodiment, a message processing method for Internet of Things is provided. FIG. 1 is a flowchart of a message processing method for Internet of Things according to an embodiment of the disclosure. As shown in FIG. 1, the method includes the following steps:

Step 102: A gateway of the Internet of Things receives one or more operation messages transmitted by a plurality of transmitters for one or more operations of a terminal; and Step 104: The gateway of the Internet of Things caches the received one or more operation messages in a message queue and pre-processes the same, and according to a processing result, sends at least one operation message in the message queue to a terminal.

In the embodiment, by the above steps, the gateway of the Internet of Things caches the received one or more operation messages transmitted by the plurality of transmitters in a message queue and pre-processes the same, and according to the processing result, sends at least one operation message in the message queue to a terminal, so that the at least one operation message sent to the terminal can be adjusted reasonably, and then executed by the terminal. In this way, the problems existing in the process of executing interactive operation on the terminal in the related art are solved, the energy consumption generated when the terminal executes the operation messages is saved, and the resource loss of the Internet of Things is reduced.

As a preferred embodiment, the pre-processing way of the gateway of the Internet of Things in Step 104 may be adjusting the sequence of execution of the operation messages, or executing at least two of the plurality of operation messages in a merging way. Of course, the above two ways may be implemented in combination. This is easily realized.

Adjusting the message by the gateway of the Internet of Things may be executed according to a policy. The policy may be used to, according to the priority of a message, the attribute of the message (such as transmitting/receiving time), the contents of the message (such as reading/writing), analyze whether the message needs to be merged and how to merge, and whether the sequence of the message needs to be adjusted and how to adjust. The policy defines a solution about the way of adjusting the executing sequence of the message, for example, the gateway of the Internet of Things has a function of adjusting a message transmitting sequence, but how to adjust is according to a specific adjusting policy.

Therefore, the pre-processing way of the gateway of the Internet of Things in Step 104 may be that, for example, the gateway of the Internet of Things adjusts the message sequence of the received one or more operation messages in the message queue corresponding to the terminal according to a configured policy; or, may be that the gateway of the Internet of Things merges the operation messages indicative of the same operation in the received one or more operation messages and/or the operation messages indicative of the same operation in the message queue corresponding to the terminal. The above ways solve the problems that the same operation is frequently executed on the terminal device within a certain period of time, or operations in conflict with each other are executed on the terminal device within a certain period of time.

As a preferred embodiment, the adjusting way of the gateway of the Internet of Things in Step 104 may also be that the executing sequence of the operation messages is adjusted according to the priority of the operation messages. In this way, the operation may be executed on the terminal according to the priority of the operation messages, which prevents a certain application or user from exclusively occupying the terminal of the Internet of Things for a long time.

For example, in the case of adjusting the message sequence of the received one or more operation messages in the message queue corresponding to the terminal, when the received one or more operation messages are in conflict with the operation messages in the message queue, and the operation messages in conflict have different priority, the gateway of the Internet of Things adjusts the sending sequence of the operation messages in the message queue according to the configured policy and executes the operation messages having high priority prior to the operation messages having low priority in the operation messages in conflict; or when the received one or more operation messages are in conflict with the operation messages in the message queue, and the operation messages in conflict have the same priority, the gateway of the Internet of Things rearranges the sending sequence of the operation messages in conflict according to the configured policy.

For another example, in the case where the gateway of the Internet of Things merges the operation messages indicative of the same operation in the received one or more operation messages and/or the operation messages indicative of the same operation in the message queue corresponding to the terminal, when the received one or more operation messages indicate the same operation as the operation messages in the message queue, and the operation messages indicative of the same operation have different priority, the gateway of the Internet of Things merges the operation messages indicative of the same operation into a corresponding position of the operation messages having the highest priority in the operation messages indicative of the same operation according to the configured policy to execute the merged operation messages; or when the received one or more operation messages indicate the same operation as the operation messages in the message queue, and the operation messages indicative of the same operation have the same priority, the gateway of the Internet of Things merges the operation messages indicative of the same operation into a position where the operation messages indicative of the same operation already existing in the message queue of the terminal are located to execute the merged operation messages; and when the received one or more operation messages indicate the same operation, the gateway of the Internet of Things merges the operation messages indicative of the same operation into the corresponding position of the operation messages having the highest priority in the operation messages according to the configured policy to execute the merged operation messages. In this way, the operation messages of the terminal may be adjusted by a way of combining the priority with adjustment of an executing sequence or with merged execution, which improves the flexibility of the solution and is easy to realize.

For example, in the case where the reading operation messages are in conflict with the sleeping operation messages, the gateway of the Internet of Things may execute the reading operation messages prior to the sleeping operation messages.

Figure 2:
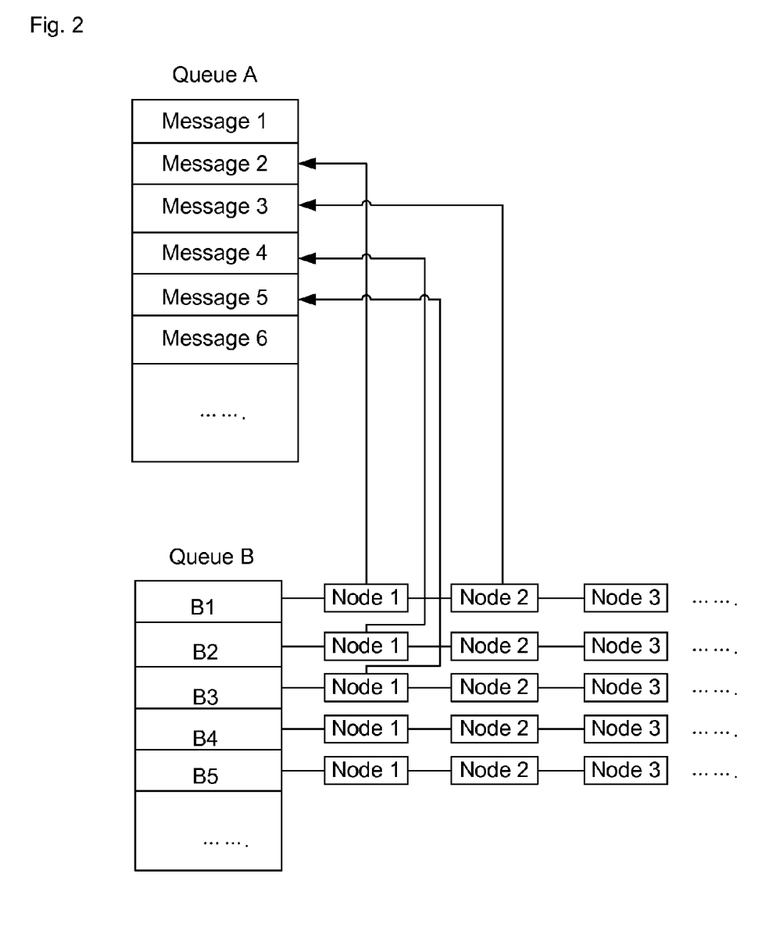
FIG. 2 is a schematic diagram of a message queue according to an embodiment of the disclosure.

As a preferred embodiment, after the gateway of the Internet of Things pre-processes the operation messages, the operation messages may be sent to the terminal through the message queue corresponding to the terminal. The message queue may include a first queue and a second queue. FIG. 2 is a schematic diagram of a message queue according to an embodiment of the disclosure. As shown in FIG. 2, the first queue (hereinafter referred to as Queue A) may be configured to store the operation messages of the terminal, which are transmitted by an application/platform or user, and each message node may include a terminal identifier, an operation instruction, an operation attribute or the like. The second queue (hereinafter referred to as Queue B) may be configured to store the sending sequence of the operation messages of the terminal, the sending sequence may include a terminal identifier, an access address of a terminal status (the status information of the terminal may be directly read through the access address) and address information corresponding to the operation messages in Queue A. For example, with reference to FIG. 2, Queue B may be composed of multiple linked lists, one of which represents a message sending linked list of one terminal, including a terminal identifier, a terminal status and a plurality of nodes, wherein the nodes are for storing the address corresponding to the message node in Queue A, and the nodes form a linked list in a sequence in which the message is sent.

In this case, the gateway of the Internet of Things may read the status information of the terminal through the access address of the terminal status in Queue B, and read the operation messages of the terminal stored in Queue A according to the address information of the operation messages in Queue B, and then send the at least one operation message which is read to the terminal according to the status information of the terminal and according to the processing result.

In an embodiment, if the status information of the terminal is a sleeping or shutdown status, the gateway of the Internet of Things may insert a wakeup or startup message before sending the at least one operation message which is read according to the processing result; or when the status information of the terminal is an executing status, and the processed operation messages have higher priority than the operation that the terminal is executing, the gateway of the Internet of Things may insert a current operation termination message before sending the at least one operation message which is read according to the processing result. In this way, the reasonability of transmitting the operation messages to the terminal may be further ensured.

In an embodiment, the terminal may execute operation according to the sequence of the processed operation messages in the message queue after receiving the operation messages transmitted from the gateway of the Internet of Things. After the operation is executed, if the operation is executed successfully, the terminal may return a success message to the gateway of the Internet of Things, wherein the success message may contain the status information of the terminal and an identifier representing successful operation; if the operation is executed unsuccessfully, the terminal may return a failure message to the gateway of the Internet of Things, wherein the failure message may contain the status information of the terminal and a cause of failure. In this way, the gateway of the Internet of Things can obtain the status information of the terminal in real time so as to adjust the operation messages according to the status of the terminal.

In an embodiment, after the gateway of the Internet of Things receives a response message returned by the terminal, if the response message is the success message or failure message, the gateway of the Internet of Things may transmit the response message to one or more transmitters of the operation messages corresponding to the response message, and then delete the operation messages from the message queue corresponding to the terminal; or if the response message indicates that the operation is being executed, the gateway of the Internet of Things may label the status information of the terminal as the executing status, and does not delete the operation messages by still placing them in the message queue. In this way, the transmitter of the operation messages may obtain the current status information of the terminal to improve the reasonability of the operation messages sent to the terminal in future.

The embodiment also provides a message processing device for Internet of Things corresponding to the above method. The device is configured to realize the above embodiments and the preferred embodiments, some of which have been described and not repeated here. As used below, the term "module" may implement the combination of software and/or hardware with predetermined functions. Although the device described in the following embodiments is preferably implemented in software, it is possible and conceived that hardware, or a combination of software and hardware may be used for implementation.

Figure 3:
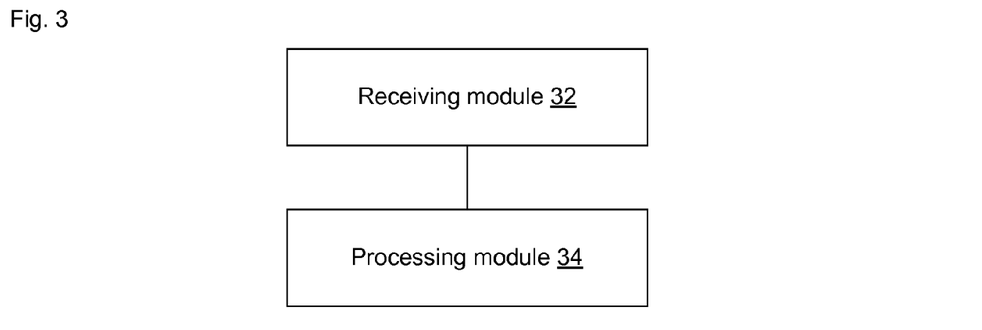
FIG. 3 is a structural diagram of a message processing device for Internet of Things according to an embodiment of the disclosure.

FIG. 3 is a message processing device for Internet of Things according to an embodiment of the disclosure, which is located in the gateway of the Internet of Things, and includes a receiving module 32 and a processing module 34, which will be described in detail below.

The receiving module 32 is configured to receive one or more operation messages transmitted by a plurality of transmitters for one or more operations of a terminal; and the processing module 34 is connected to the receiving module 32 and configured to cache the operation messages received by the receiving module 32 in a message queue and pre-process the same, and according to the processing result, send the operation messages in the message queue to a terminal.

In the embodiment, by the above modules, the gateway of the Internet of Things, through the processing module 34, caches the operation messages received by the receiving module 32 and transmitted by the plurality of transmitters in a message queue and pre-processes the received one or more operation messages, and according to the processing result, sends the operation messages in the message queue to a terminal, so that the operation messages sent to the terminal can be adjusted reasonably, and then executed by the terminal. In this way, the problems existing in the process of executing interactive operation on the terminal in the related art are solved, the energy consumption generated when the terminal executes the operation messages is saved, and the resource loss of the Internet of Things is reduced.

Figure 4:
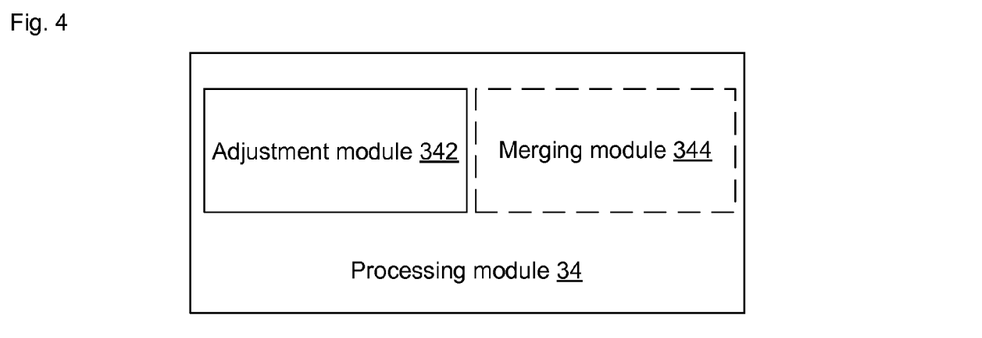
FIG. 4 is a preferred structural diagram of a processing module according to an embodiment of the disclosure.

FIG. 4 is a preferred structural diagram of a processing module 34 according to an embodiment of the disclosure. As shown in FIG. 4, the processing module 34 may include an adjustment module 342 configured to adjust the message sequence of the received one or more operation messages in the message queue corresponding to the terminal according to a configured policy, and/or a merging module 344, configured to merge the operation messages indicative of the same operation in the received one or more operation messages and/or the operation messages indicative of the same operation in the message queue corresponding to the terminal.

Figure 5:
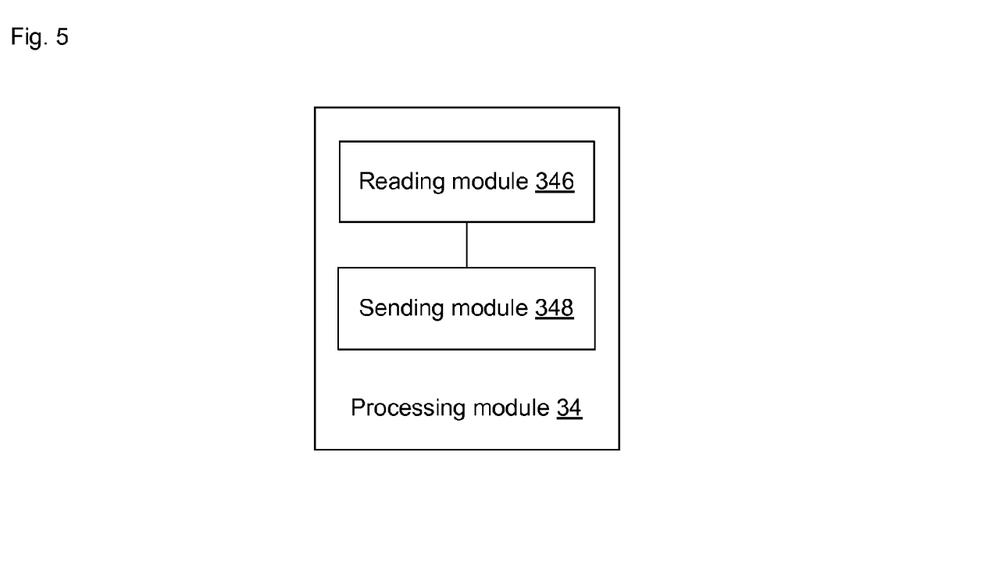
FIG. 5 is a preferred structural diagram of another processing module according to an embodiment of the disclosure.

FIG. 5 is a preferred structural diagram of another processing module 34 according to an embodiment of the disclosure. As shown in FIG. 2, the message queue corresponding to the terminal includes Queue A and Queue B, the Queue A is configured to store the operation messages of the terminal, the Queue B is configured to store the sending sequence of the operation messages of the terminal. In the case where the sending sequence include an access address of a terminal status and address information corresponding to the operation messages in the first queue, the processing module 34 may also include a reading module 346 configured to read status information of the terminal according to the access address in Queue B and read the operation messages of the terminal stored in Queue A according to the address information of the operation messages in Queue B, and a sending module 348, connected to the reading module 346 and configured to, according to the status information of the terminal read by the reading module 346, send the at least one operation message read by the reading module 346 to the terminal according to the processing result.

Figure 6:
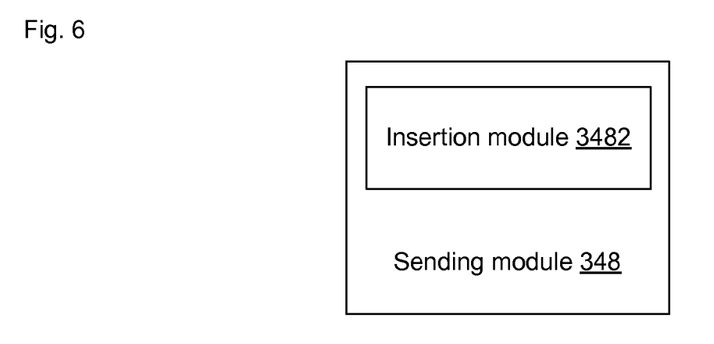
FIG. 6 is a preferred structural diagram of an sending module according to an embodiment of the disclosure.

FIG. 6 is a preferred structural diagram of a sending module 348 according to an embodiment of the disclosure. As shown in FIG. 6, the sending module 348 may include an insertion module 3482 configured to, when the status information of the terminal is a sleeping or shutdown status, insert a wakeup or startup message before the at least one operation message which is read is sent according to the processing result, or when the status information of the terminal is an executing status, and the processed operation messages have higher the priority than the operation that is being executed by the terminal, insert a message of terminating the current operation before the at least one operation message which is read is sent according to the processing result.

Figure 7:
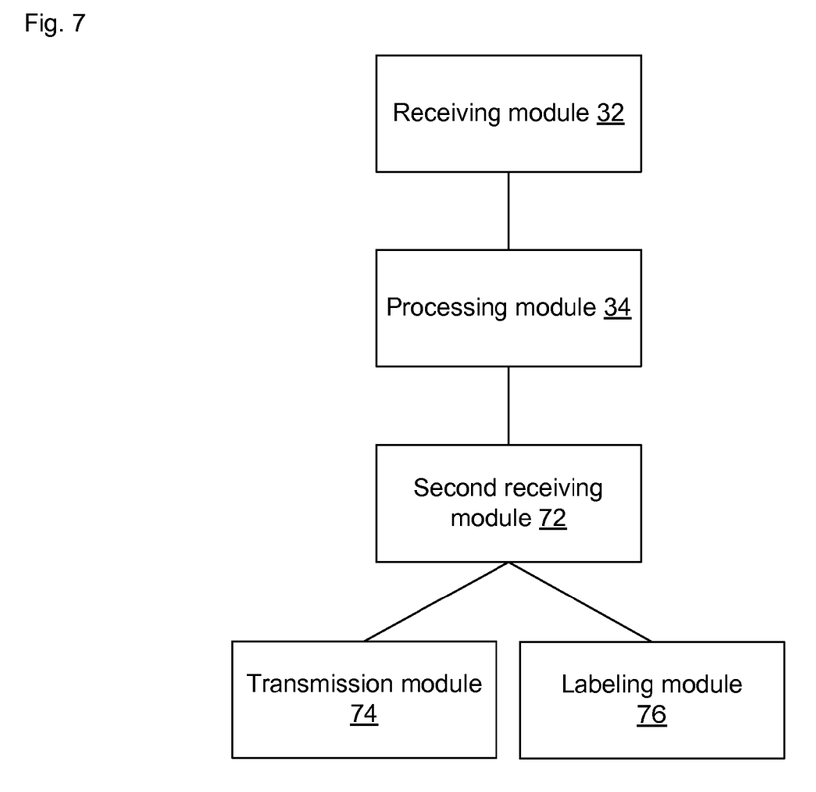
FIG. 7 is a preferred structural diagram of a message processing device for Internet of Things according to an embodiment of the disclosure.

FIG. 7 is a preferred structural diagram of a message processing device for Internet of Things according to an embodiment of the disclosure. As shown in FIG. 7, the device may further include a second receiving module 72 connected to the processing module 34 and configured to receive a response message returned by the terminal, a transmission module 74, connected to the second receiving module 72 and configured to, when the response message received by the second receiving module 72 is a success message or failure message, transmit the response message to one or more transmitters of the operation messages corresponding to the response message, and delete the operation messages corresponding to the response message from the message queue corresponding to the terminal, and/or a labelling module 76 connected to the second receiving module 72 and configured to, when the response message received by the second receiving module 72 is that the operation is being executed, label the status information of the terminal as the executing status.

Figure 8:
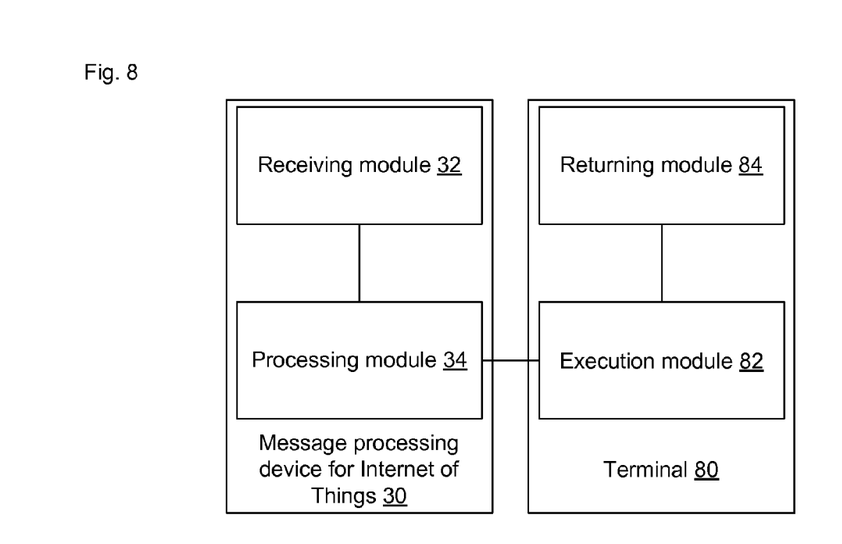
FIG. 8 is a structural diagram of a message processing system for Internet of Things according to an embodiment of the disclosure.

FIG. 8 is a structural diagram of a message processing system for Internet of Things according to an embodiment of the disclosure. As shown in FIG. 8, the message processing system for Internet of Things includes a message processing device 30 for Internet of Things according to any one of FIG. 3 to FIG. 7 (which will be described in FIG. 8 by taking FIG. 3 as an example), and further includes a terminal 80, wherein the terminal 80 includes an execution module 82 configured to execute operation in sequence of processed operation messages in the message queue, and a returning module 84 connected to the execution module 82 and configured to, when the operation is executed successfully, return a success message to the gateway of the Internet of Things, wherein the success message includes the status information of the terminal, and when the operation is executed unsuccessfully, return a failure message to the gateway of the Internet of Things, wherein the failure message includes the status information of the terminal and a cause of failure.

A description will be given in conjunction with preferred embodiments, and the following preferred embodiments are combined with the above embodiments and other preferred embodiments.

Embodiment I

In the preferred embodiment, a description is given by taking the field of the Internet of Things as an example. A method and system for supporting multiple applications or multiple users (including multiple users of the same application) to operate the same terminal simultaneously in a gateway of the Internet of Things are provided.

In the preferred embodiment, the provided system and method for realizing high efficient operation performed on the terminal by the application/platform or multiple users avoid the conflict or reduce resource loss caused by the operation performed on the terminal by the multiple applications/platforms or multiple users in the Internet of Things by analyzing the message sent by the application/platform or multiple users, setting the message sequence and sending the sequenced messages to the terminal.

In the preferred embodiment, the system for supporting simultaneous operation on the same terminal by multiple applications/platforms or multiple users in a gateway of the Internet of Things includes a device management module and a message scheduling module, which will be described in detail below.

The device management module is configured to manage basic attribute information of the terminal, monitor the status of the terminal, and manage an identifier of the terminal.

The message scheduling module (realizing the function of the processing module 34 in the above embodiment) is communicated with the device management module, sets a queue of sending messages, and sends each message according to an operation sequence.

Meanwhile, in the preferred embodiment, a method for supporting simultaneous operation on the same terminal by multiple applications or multiple users is also provided. The method includes the following steps.

Step I: The message scheduling module receives the operation messages transmitted by the application/platform to the terminal, wherein the operation messages include an identifier of an operated terminal, an operation instruction and an operation attribute or the like.

Here, the operation attribute may include the priority of the operation, the transmitter of the operation, the initiating time of the operation.

Step II: The message scheduling module obtains the current status information of the terminal through the status access address of the terminal device provided by the device management module, including an operation status of the terminal, an operation mode of the terminal or the like.

Here, the status access address is stored in the message queue corresponding to each terminal. The operation mode may be sleep, busy, or the like; and the operation mode may be an energy-saving mode, a normal mode, or the like.

Step III: The message scheduling module processes the messages according to the status information of the terminal, the operation instruction and the operation attribute and sets the sending sequence, for example: merging the same operation, rearranging the conflicted operation, performing operation pursuant to priority from high to low, adding wakeup operation prior to the sleep operation, and finishes sending the messages in order.

Step IV: The terminal returns the response message to the message scheduling module after executing the operation, and notifies the message scheduling module that the operation has been executed completely or unsuccessfully. The response message contains the current status information of the terminal. The message scheduling module transfers the status information of the terminal to the device management module, and the device management module updates and manages the status of the terminal according to the latest status information of the terminal.

In the preferred embodiment, the message scheduling module analyzes the messages of the operated terminal, merges the messages indicative of the same operation in the operation messages of the same terminal within a certain period of time, and rearranges the messages indicative of conflicted operation, so that the resource loss caused by the same operation or conflict is reduced and the operation efficiency of the terminal is improved.

Figure 9:
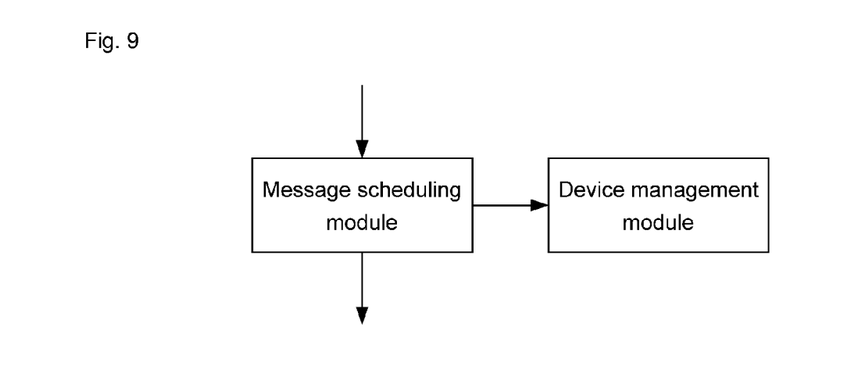
FIG. 9 is a structural diagram of a processing device of operation message distribution for realizing that a gateway of the Internet of Things supports operations of multiple applications/platforms or multiple users according to Embodiment I of the disclosure.

FIG. 9 is a structural diagram of a processing device for operation message distribution for realizing that a gateway of the Internet of Things supports operation by multiple applications/platforms or multiple users according to Embodiment I of the disclosure. As shown in FIG. 9, the structural diagram includes a message scheduling module and a device management module.

The message scheduling module receives the operation messages transmitted by the application/platform or user to the terminal. Here, the operation messages include an operation instruction, an operation attribute and an identifier of the operated terminal, wherein the operation attribute includes the priority of the operation, the transmitter of the operation, the time of initiating and receiving the operation. There are many policies to set a time range, for example setting it to be a value indicating that the applications/platforms require the shortest time length of feedback or other reasonable value, remotely setting through the platforms/applications, or setting through local setting and other ways.

The message scheduling module includes a message queue, judges whether the operation indicated in the received terminal operation messages is the same as or in conflict with the terminal operation in the message queue or whether the multiple terminal operations received simultaneously are the same or in conflict; if the same operation exists, the message scheduling module merges these operation messages according to the information such as the operation attribute, and policy, and if the conflicted operations exist, the message scheduling module rearranges the operation sequence of the message queue according to the information such as the operation instruction, the operation attribute, and the policy.

The message queue includes Queue A and Queue B (as shown in FIG. 2). The Queue A stores the operation messages transmitted by the applications/platforms, each message node includes a terminal identifier, an operation instruction, an operation attribute or the like. The Queue B is composed of a plurality of linked lists Bx (x=1, 2, . . . ), each of which represents one sending sequence of operation messages of the terminal, for example, the message scheduling module sends the operation messages in a sequence of node 1, node 2, node 3, . . . , and the linked list includes the terminal identifier and the address of the terminal status, wherein the device management module stores the access address of the terminal status, and the message scheduling module may directly read the status information of the terminal through the address.

The message scheduling module transmits the operation messages to the terminal in the sequence in Queue B. The terminal returns a finish or failure message after executing the operation messages. The returned message includes a success identifier, terminal status information or a cause of failure. The message scheduling module transfers the terminal status information in the returned message to the device management module. Meanwhile, the message scheduling module deletes the operation messages from the message queue after returning the finish or failure message to the applications/platforms. If the finish message is returned, and the terminal is executing the operation, the message queue still reserves the message node, and the message status is still labelled as the being-executed status.

The message scheduling module exchanges the information with the device management module, and inquires the device management module about the status information of the terminal. The device management module updates and manages the corresponding status of the terminal according to the received status information of the terminal transmitted by the message scheduling module.

Embodiment II

The preferred embodiment is mainly described by taking a flow of processing conflicted operations of multiple applications/platforms or multiple users as an example.

Figure 10:
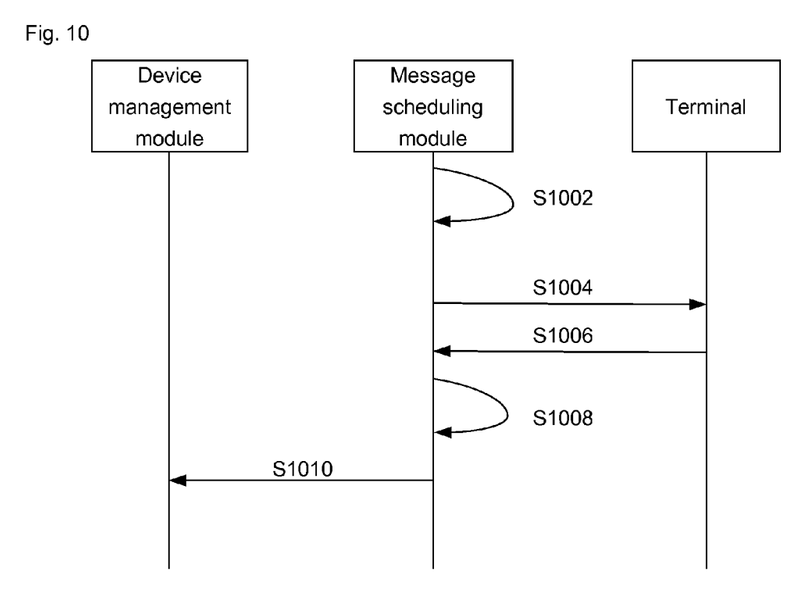
FIG. 10 is a flowchart of processing a conflict of operations of multiple applications/platforms or multiple users according to Embodiment II of the disclosure.

In the preferred embodiment, the gateway of the Internet of Things receives the operation messages transmitted by the application/platform or user within a certain period of time, and the operation messages need to be transmitted to a specified terminal through the gateway of the Internet of Things. Since the operated terminal is the same terminal, different operation sequences will result in conflicted operations, for example, simultaneously requesting to execute the operation of making the terminal sleep and the operation of reading data from the terminal. If a closing operation is firstly executed, the terminal needs to be awakened at the time of executing the reading operation. FIG. 10 is a flowchart of processing a conflict of operations of multiple applications/platforms or multiple users according to Embodiment II of the disclosure. As shown in FIG. 10, the step that the gateway of the Internet of Things processes the conflict among the operation messages within a certain period of time is as follows.

Step S1002: The conflict is determined whether to be present by analyzing the received one or more operation messages of the terminal and then processed. The message scheduling module receives the operation messages transmitted by multiple applications/platforms or multiple users to the terminal within a certain period of time, and the operation messages include a terminal identifier, an operation instruction and an operation attribute or the like. The message scheduling module checks whether the operation messages of the terminal are present in the current message queue, and, if the operation messages of the terminal are present, and the priority of the operation thereof is not higher than that of the already existing operation messages of the terminal, then analyzes the currently received one or more operation messages and the operation messages of the terminal in the queue, judges whether the addition of the currently received one or more operation messages into the message queue will cause a conflict, and rearranges the sequence of the operation messages of the terminal according to a policy, for example, implementing the sleeping operation behind the reading operation.

If the same operation messages of the terminal are included, but the priority of the operation thereof is higher than that of all or a part of the operation messages already existing in the message queue, then the message node is inserted into a suitable position in the message queue according to the operation attribute of the currently received one or more operation messages.

If multiple messages sent to the same operated terminal but with different operation instructions are received simultaneously, and the message queue does not include other operation messages of the operated terminal, the conflict is analyzed according to the operation instructions and operation attributes of multiple received operation messages and the sequence of the operation messages is arranged according to the policy, and multiple message nodes of the terminal are placed in the message queue according to the arranged sequence.

Step 1004: The operation messages are transmitted to the terminal in the message queue. The message scheduling module transmits the operation messages to the terminal in the sequence as in Queue B. The message queue obtains the current status of the terminal through the corresponding access address of the status of the terminal in Queue B, judges whether the operation messages may be transmitted, and arranges the operation according to the status of the terminal and the operation instruction. For example, when the current terminal is in a sleeping or shutdown status, the operation messages such as wakeup or startup messages need to be transmitted firstly before the operation messages are transmitted, the terminal is awakened to return a success message and re-transmits the operation messages after updating the status of the terminal. Alternatively, when the current terminal is executing a certain operation, but the level of the operation message is high, a message for terminating the current operation may be transmitted. The terminal re-transmits the operation messages to the terminal after returning the success message. The operation messages are changed from to-be-sent messages to being-executed messages after the operation messages are transmitted.

Step 1006: An operation finish or failure message is returned. The terminal receives the operation messages, and executes operation according to the operation instruction of the operation messages. If the operation is successful, the success message is returned to the message scheduling module, wherein the success message includes the status information of the terminal, and the identifier representing the successful operation or the like. If the operation is unsuccessful, the failure message is returned to the message scheduling module, wherein the failure message includes the cause of failure, and the status information of the terminal or the like.

Step 1008: The message queue is updated. The message scheduling module receives the message returned by the terminal and updates the message queue. If the returned message is a message indicating that the operation of the terminal has been executed completely or unsuccessfully, the returned message is transmitted to one or more applications/platforms which transmitted the operation messages, and the corresponding operation messages and nodes thereof are deleted from the message queue. If the returned message is that the terminal still executes operation, the operation messages are still placed in the message queue and labelled as the being-executed status.

Step 1010: The status information of the terminal is transmitted. The message scheduling module transmits the current status information returned by the terminal to the device management module, and the device management module updates the status of the terminal according to the received information.

Embodiment III

The preferred embodiment is mainly described by taking the same processing flow of operation messages of multiple applications/platforms or multiple users as an example.

Figure 11:
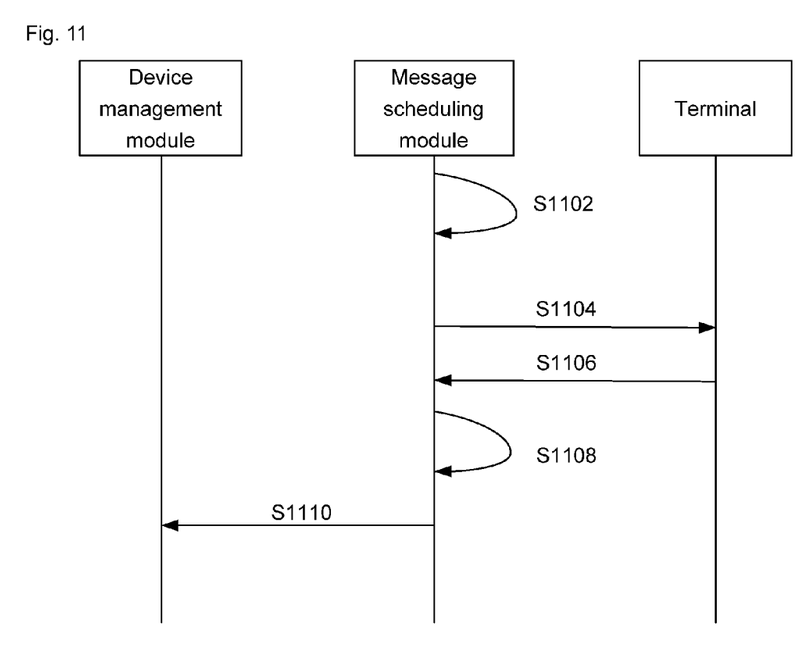
FIG. 11 is a flowchart of processing the same operation of multiple applications/platforms or multiple users according to Embodiment III of the disclosures.

In the preferred embodiment, the gateway of the Internet of Things receives within a certain period of time the operation messages transmitted by multiple applications/platforms or multiple users to operate a terminal, and the operation messages are transmitted to the same terminal through the gateway of the Internet of Things. Since the operation messages are sent to the same operated terminal, multiple same operations will be executed on the same terminal, which results in the waste of resources, for example, the operations of reading data from the terminal are simultaneously required to be executed, and if multiple same operation messages are transmitted to the terminal for many times, then the same data will be read for many times. FIG. 11 is a flowchart of processing the same operation of multiple applications/platforms or multiple users according to Embodiment III of the disclosures. As shown in FIG. 11, the step that the gateway of the Internet of Things processes the received one or more operation messages indicative of the same operation within a certain period of time is as follows.

Step 1102: The received one or more operation messages of the terminal are analyzed to determined whether a same operation is present and the operation is then processed. The message scheduling module receives within a certain period of time the operation messages transmitted by multiple applications/platforms or multiple users to the terminal, and the operation messages include a terminal identifier, an operation instruction and a operation attribute or the like. The message scheduling module inquires about whether the same operation messages are present for the terminal in the current message queue; if the operation messages having the same operation instruction are present, and the priority of the operation thereof is not higher than that of the already existing same operation messages, then the message scheduling module merges the currently received one or more operation messages into the already existing same operation messages in the message queue.

If the operation messages having the same operation instruction are included, but the priority of the operation thereof is higher than that of the already existing same operation messages, the operation messages having the same operation instruction are merged, and the merged operation messages are placed in a suitable position in the message queue B (the new position may be in preference to the queue position of the merged operation messages) according to the comparison and analysis of the operation attribute and the attribute of other operation messages preceding the merged operation messages in the message queue.

If the same operation messages are not present currently, and the multiple same operation messages are received simultaneously, the multiple operation messages are directly merged into one message, and the priority of the merged operation messages is the maximum value of the multiple operation messages.

Step 1104: The operation messages are transmitted to the terminal in the message queue. The message scheduling module transmits the operation messages to the terminal in the sequence as in message queue B. The current status of the terminal needs to be obtained according to the status access address of the terminal in Queue B before the operation messages are transmitted, so as to determine whether the operation messages may be transmitted, and arrange operation according to the status of the terminal and an operation instruction. For example, when the current terminal is in a sleeping or shutdown status, the operation messages such as wakeup or startup messages need to be transmitted firstly before the operation messages are transmitted, and then transmits the operation messages after the terminal has been awakened to return a success message and the status of the terminal has been updated. Alternatively, when the current terminal is executing a certain operation, but the level of the operation message is high, a message for terminating the current operation may be transmitted, and then the operation messages are transmitted to the terminal after the terminal has returned a success message. The operation messages are labelled as being-executed messages changed from the to-be-sent messages after the operation messages are transmitted.

Step 1106: An operation finish or failure message is returned. The terminal receives the operation messages, and executes operation according to the operation instruction in the operation messages. If the operation is successful, the success message is returned to the message scheduling module, wherein the success message includes status information of the terminal, and an identifier representing the successful operation or the like. If the operation is unsuccessful, the failure message is returned to the message scheduling module, wherein the failure message includes the cause of failure, and the status information of the terminal or the like.

Step 1108: The message queue is updated. The message scheduling module receives the message returned by the terminal and updates the message queue. If the returned message is a message indicating that the operation of the terminal has been executed completely or unsuccessfully, the returned message is transmitted to one or more applications/platforms which transmitted the operation messages, and the corresponding operation messages and nodes thereof are deleted from the message queue. If the returned message is that the terminal still executes operation, the operation messages are still placed in the message queue and labelled as the being-executed status.

Step 1110: The status information of the terminal is transmitted. The message scheduling module transmits the current status information returned by the terminal to the device management module, and the device management module updates the status of the terminal according to the received information.

In the above description, the terminal refers to a terminal device.

In another embodiments, software is provided, which is configured to execute the above embodiments and the technical solutions described in preferred embodiments.

In another embodiment, a storage medium is also provided, which stores the above software, and includes but is not limited to an optical disk, a floppy disk, a hard disk, an erasable memory, or the like.

Obviously, those skilled in the art should understand that each of the mentioned modules or steps of the disclosure may be achieved by a universal computing device; the modules or steps may be integrated in a single computing device, or distributed in the network formed by multiple computing devices. Optionally, they may be implemented by a program code which may be executed by the computing device, thereby, the modules or steps may be stored in a storage device and executed by the computing device, or in some cases, the steps shown or described may be executed in an order different from here, or may be respectively manufactured to be each integrated circuit module, or multiple modules or steps thereof may be manufactured to be a single integrated circuit module, thus to be implemented. In this way, the disclosure is not limited to any particular hardware and software combination.

The above are only the preferred embodiments of the disclosure and are not intended to limit the disclosure. For those skilled in the art, various changes and modifications may be made to the disclosure. Any modifications, equivalent replacements, improvements and the like within the spirit and principle of the disclosure shall be contained within the scope of protection of the claims of the disclosure.

What is claimed is:

1. A message processing method for Internet of Things, comprising:
   receiving, by a gateway of Internet of Things, one or more operation messages transmitted by a plurality of transmitters for one or more operations of a terminal; and
   caching and pre-processing, by the gateway of the Internet of Things, the received one or more operation messages in a message queue, and according to a processing result, sending at least one operation message in the message queue to the terminal,
   wherein pre-processing, by the gateway of the Internet of Things, the received one or more operation messages in a message queue comprises at least one of the following:
   adjusting, by the gateway of the Internet of Things, a message sequence of the received one or more operation messages in the message queue corresponding to the terminal according to a configured policy; and
   merging, by the gateway of the Internet of Things, operation messages indicative of a same operation in the received one or more operation messages and/or operation messages indicative of the same operation in the message queue corresponding to the terminal,
   wherein the message queue corresponding to the terminal comprises a first queue and a second queue, the first queue is configured to store operation messages of the terminal, the second queue is configured to store a sending sequence of the operation messages of the terminal, the sending sequence comprises address information corresponding to the operation messages in the first queue and an access address of a status of the terminal;
   correspondingly, sending at least one operation message in the message queue to the terminal according to the processing result comprises:
      reading, by the gateway of the Internet of Things, status information of the terminal according to the access address in the second queue;
      reading, by the gateway of the Internet of Things, at least one operation message of the terminal stored in the first queue according to the address information of the operation messages in the second queue; and
   sending, by the gateway of the Internet of Things, the at least one operation message which is read to the terminal according to the status information of the terminal and the processing result.

2. The message processing method according to claim 1, wherein adjusting the message sequence of the received one or more operation messages in the message queue corresponding to the terminal comprises:
   when there is a conflict between the received one or more operation messages and one or more operation messages in the message queue, and operation messages in conflict have different priority, adjusting, by the gateway of the Internet of Things, a sending sequence of operation messages in the message queue according to the configured policy and executing operation messages having high priority prior to operation messages having low priority in the operation messages in conflict; and/or
   when there is a conflict between the received one or more operation messages and one or more operation messages in the message queue, and operation messages in conflict have same priority, rearranging, by the gateway of the Internet of Things, a sending sequence of the operation messages in conflict according to the configured policy.

3. The message processing method according to claim 1, wherein merging, by the gateway of the Internet of Things, the operation messages indicative of a same operation in the received one or more operation messages and/or the operation messages indicative of the same operation in the message queue corresponding to the terminal comprises:
   when the received one or more operation messages indicate a same operation as one or more operation messages in the message queue, and operation messages indicative of the same operation have different priority, merging, by the gateway of the Internet of Things, the operation messages indicative of the same operation into a corresponding position of an operation message having highest priority in the operation messages indicative of the same operation and executing the merged operation messages according to the configured policy; and/or
   when the received one or more operation messages indicate a same operation as one or more operation messages in the message queue, and operation messages indicative of the same operation have same priority, merging, by the gateway of the Internet of Things, the operation messages indicative of the same operation into a position where the operation messages indicative of the same operation already existing in the message queue of the terminal are located and executing the merged operation messages; and/or
   when the received one or more operation messages indicate a same operation, merging, by the gateway of the Internet of Things, the operation messages indicative of the same operation into a corresponding position of an operation message having highest priority in the received one or more operation messages according to the configured policy.

4. The message processing method according to claim 1, wherein sending, by the gateway of the Internet of Things, the at least one operation message which is read to the terminal according to the status information of the terminal and the processing result comprises:
   when the status information of the terminal indicates a sleeping or shutdown status, inserting, by the gateway of the Internet of Things, a wakeup or startup message before sending the at least one operation message which is read according to the processing result; or
   when the status information of the terminal indicates an executing status, and priority of the at least one operation message to be transmitted which has been processed in the message queue is higher than an operation that the terminal is executing, inserting, by the gateway of the Internet of Things, a current operation termination message before sending the at least one operation message that is read according to the processing result.

5. The message processing method according to claim 1, after sending the at least one operation message in the message queue to the terminal according to the processing result, the method further comprising:
   executing, by the terminal, operations according to a sequence of the at least one operation message processed in the message queue;
   when an operation is executed successfully, returning, by the terminal, a success message to the gateway of the Internet of Things, wherein the success message contains status information of the terminal; or when the operation is executed unsuccessfully, returning, by the terminal, a failure message to the gateway of the Internet of Things, wherein the failure message contains status information of the terminal and a cause of failure.

6. The message processing method according to claim 5, further comprising:
receiving, by the gateway of the Internet of Things, a response message returned by the terminal;
when the response message is the success message or failure message, transmitting, by the gateway of the Internet of Things, the response message to one or more transmitters of one or more operation messages corresponding to the response message, and deleting the operation message corresponding to the response message from the message queue corresponding to the terminal; or
when the response message indicates that an operation is being executed, labelling, by the gateway of the Internet of Things, the status information of the terminal as an executing status.

7. A message processing device for Internet of Things, located in a gateway of the Internet of Things, comprising:
a processor;
a receiving module, configured to receive one or more operation messages transmitted by a plurality of transmitters for one or more operations of a terminal; and
a processing module, configured to cache and pre-process the received one or more operation messages in a message queue, and according to a processing result, send at least one operation message in the message queue to the terminal,
wherein the device further comprises:
an adjustment module, configured to adjust a message sequence of the received one or more operation messages in the message queue according to a configured policy; and/or
a merging module, configured to merge operation messages indicative of a same operation in the received one or more operation messages and/or operation messages indicative of the same operation in the message queue corresponding to the terminal,
wherein the message queue corresponding to the terminal comprises a first queue and a second queue, the first queue is configured to store operation messages of the terminal, the second queue is configured to store a sending sequence of the operation messages of the terminal, the sending sequence comprises address information corresponding to the operation messages in the first queue and an access address of a status of the terminal;
correspondingly, the processing module comprises:
a reading module, configured to read status information of the terminal according to the access address in the second queue, and read at least one operation message of the terminal stored in the first queue according to the address information of the operation messages in the second queue; and
a sending module, configured to send the at least one operation message that is read in the message queue to the terminal according to the status information of the terminal and according to the processing result.

8. The message processing device according to claim 7, wherein the sending module comprises:
an insertion module, configured to, when the status information of the terminal indicates a sleeping or shutdown status, insert a wakeup or startup message before the at least one operation message that is read is sent according to the processing result; or when the status information of the terminal indicates an executing status, and priority of the at least one operation message to be transmitted in the message queue after pre-processing is higher than an operation that the terminal is executing, insert a current operation termination message before the at least one operation message which is read is sent according to the processing result.

9. The message processing device according to claim 7, further comprising:
a second receiving module, configured to receive a response message returned by the terminal;
a transmission module, configured to, when the response message is a success message or a failure message about operation execution, transmit the response message to one or more transmitters of one or more operation messages corresponding to the response message, and delete the one or more operation messages corresponding to the response message from the message queue corresponding to the terminal; and/or
a labelling module, configured to, when the response message is that an operation is being executed, label the status information of the terminal as an executing status.

10. A message processing system for Internet of Things, comprising a message processing device for Internet of Things and a terminal,
wherein the message processing device comprises:
a processor;
a receiving module, configured to receive one or more operation messages transmitted by a plurality of transmitters for one or more operations of the terminal; and
a processing module, configured to cache and pre-process the received one or more operation messages in a message queue, and according to a processing result, send at least one operation message in the message queue to the terminal;
and wherein the terminal comprises:
an execution module, configured to execute operations in a sequence of the at least one operation message processed in the message queue; and
a returning module, configured to, when an operation is executed successfully, return a success message to the gateway of the Internet of Things, wherein the success message contains status information of the terminal; and when the operation is executed unsuccessfully, return a failure message to the gateway of the Internet of Things, wherein the failure message contains status information of the terminal and a cause of failure,
wherein the terminal further comprises:
a processor;
an adjustment module, configured to adjust a message sequence of the received one or more operation messages in the message queue according to a configured policy; and/or
a merging module, configured to merge operation messages indicative of a same operation in the received one or more operation messages and/or operation messages indicative of the same operation in the message queue corresponding to the terminal,
wherein the message queue corresponding to the terminal comprises a first queue and a second queue, the first queue is configured to store operation messages of the terminal, the second queue is configured to store a sending sequence of the operation messages of the terminal, the sending sequence comprises address information corresponding to the operation messages in the first queue and an access address of a status of the terminal;

correspondingly, the processing module comprises:
- a reading module, configured to read status information of the terminal according to the access address in the second queue, and read at least one operation message of the terminal stored in the first queue according to the address information of the operation messages in the second queue; and
- a sending module, configured to send the at least one operation message that is read in the message queue to the terminal according to the status information of the terminal and according to the processing result.

* * * * *